United States Patent

Neeley et al.

[15] 3,640,598
[45] Feb. 8, 1972

[54] TECHNIQUE OF HOLOGRAPHY BY SOURCE SCANNING

[72] Inventors: Victor I. Neeley, Kennewick; Hugo L. Libby, Richland, both of Wash.

[73] Assignee: Holotron Corporation, Wilmington, Del.

[22] Filed: Aug. 23, 1967

[21] Appl. No.: 662,736

[52] U.S. Cl. .................................................. 350/3.5, 343/5
[51] Int. Cl. ............................................................ G02b 27/22
[58] Field of Search ............................................... 350/3.5

[56] References Cited

UNITED STATES PATENTS 3,461,420   8/1969   Silverman ............................... 350/3.5

OTHER PUBLICATIONS

Leith et al., Journal of the Optical Society of America, vol. 54, no. 11, pp. 1295-1297 (11/1964).
Leith et al., S.P.I.E. Journal, vol. 4, pp. 3-6, (10/1965).

Primary Examiner—David Schonberg
Assistant Examiner—Robert L. Sherman
Attorney—Woodcock, Washburn, Kurtz & Machiewicz

[57] ABSTRACT

A technique of making holograms of three-dimensional objects with electromagnetic or ultrasonic radiation; a point source of radiation for the object beam is scanned over a plane and is received at a point. Holographic information is then obtained by mixing the received object beam with a coherent reference beam, either derived from the object beam source or introduced electronically. Reciprocity between the disclosed source-scanning technique and the conventional receiver-scanning technique is shown and specific embodiments are disclosed which utilize the source-scanning technique and which are illustrative of benefits which may be obtained through the utilization of such technique over the receiver-scanning technique.

17 Claims, 3 Drawing Figures

TECHNIQUE OF HOLOGRAPHY BY SOURCE SCANNING

BACKGROUND OF THE INVENTION

1. Field of the Invention

This invention relates to holography and more specifically to that type of holography in which scanning techniques are used in order to, for example, cover a wider field of view.

2. Brief Description of the Prior Art

In conventional off-axis holography, a hologram of an object is produced by directing coherent radiation to the object and then to a hologram detector surface which records the interference pattern between the object beam and a reference beam coherent with the object beam and directed to the hologram detector surface at an angle therewith. After the hologram detector surface is developed, an image of the original object can be reconstructed by directing spatially coherent, monochromatic radiation to the hologram. The image may be viewed by looking through the hologram as if it were a window and all the characteristics of real life objects, such as three dimensionality and parallax, may be observed.

The holographic information may be detected directly by introducing the reference beam and directing it to the hologram detector surface at a given angle, or the holographic information can be obtained electronically by first receiving the object beam and converting it into a proportional electrical signal and then mixing this signal with a reference signal coherent therewith. For purposes of the present invention, it makes no difference whether the hologram is made by detecting the holographic information directly or by first receiving the object signal and then producing the holographic information electronically.

Holography can be carried out with virtually any type of wave phenomena where coherent waves are generated. Examples include visible light, microwaves, microwave modulation of visible light, and ultrasonic waves. For an example of holography in which a construction of visible light holograms is disclosed, see Leith and Upatnieks, U.S. Pat. application Ser. No. 361,977 filed Apr. 23, 1964, now U.S. Pat. No. 3,506,327 issued Apr. 14, 1970. For an example of the construction of holograms utilizing visible light modulated at microwave frequencies, see Nelson and St. John, U.S. Pat. application Ser. No. 616,086, filed Feb. 14, 1967, now U.S. Pat. No. 3,529,083 issued Sept. 15, 1970. For an example of ultrasonic holography, see Brenden, U.S. Pat. application Ser. No. 569,914, filed Aug. 3, 1966.

In the usual type of holography utilizing electromagnetic radiation in or near the visible spectrum, the holographic detector comprises a spatially extended detector plane, such as a sheet of photographic film. In ultrasonic holography, the detector also comprises a spatially extended surface such as the interface between a body of water and air. A spatially extended hologram detector surface is not an absolute requirement; rather, some sort of receiver-scanning mechanism may be substituted, such as an array of sequentially pulsed photocells in the case of visible light or modulated visible light, antennas in the case of microwaves, or ultrasonic transducers in the case of ultrasound. This technique can be thought of as scanning a point receiver or detector across the hologram surface or hologram plane. The holographic information can then be recorded and the reconstruction process may be carried out by converting the information into a spatially extended hologram, such as a film transparency. The holographic information detected by the receiver-scanning apparatus may be converted into a hologram with different types of radiation and may also be transmitted over long distances for utilization.

In some of the potential applications of holography, however, the scanned receiver technique may present problems which may limit its use. One drawback of the receiver-scanning technique is that any noise generated by the receiver-scanning mechanism may adversely affect the quality of the information received or detected by the receiver. Additionally it may be important that the information be received at some location which may be inaccessible or where it may be extremely difficult to position a receiver-scanning mechanism. The purpose of this invention is to provide a holographic scanning technique which obviates the potential drawbacks of receiver-scanning holographic techniques and which will potentially give rise to new holographic applications which may heretofore have been impractical or impossible.

It is therefore an object of this invention to provide a new holographic scanning technique.

It is a more specific object of this invention to provide an improved holographic scanning technique which obviates some of the difficulties encountered in the receiver-scanning holographic technique.

SUMMARY OF THE INVENTION

Briefly, the objects of this invention are obtained in a holographic scanning technique wherein the object signal is produced by illuminating the object with a point source of coherent waves, the point source being scanned over a source plane, the object signal being subsequently received at a fixed point in space that is also fixed relative to the object and mixed with a coherent reference signal to produce the holographic information.

Although the invention is specifically pointed out and described in the appended claims, the basic underlying principles of this invention, together with specific embodiments, may be better understood with reference to the following detailed description taken in conjunction with the following drawings, in which:

DETAILED DESCRIPTION OF THE DRAWINGS

Figure 1:
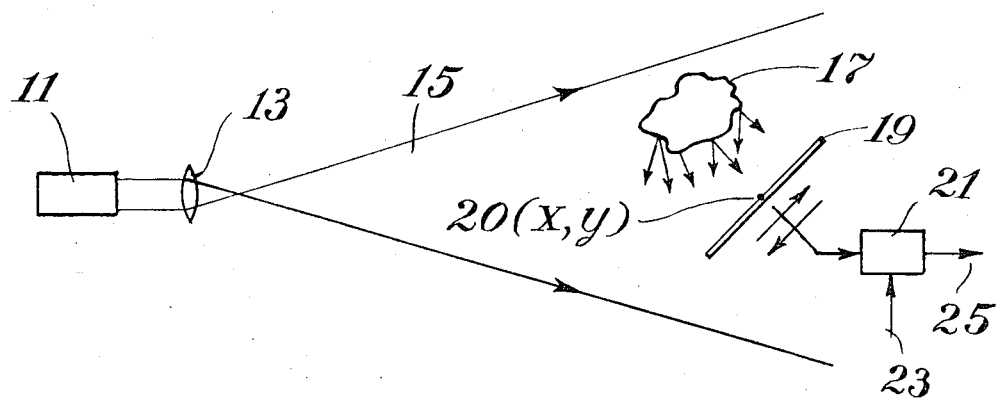
FIG. 1 is a diagrammatical representation of a conventional receiver scanning holographic technique.

Referring to FIG. 1, there is depicted a conventional receiver-scanning technique of producing holograms of three-dimensional objects with coherent wave radiation, which in this example is taken to be visible light. A source of coherent radiation 11, which may be a laser, directs a beam of light through a lens 13 which produces a diverging wave front 15 of coherent radiation. The wavefront 15 intercepts an object 17 which in turn scatters radiation by reflection and diffraction. Some of the radiation scattered by the object 17 is intercepted by a point receiver 20 which is indicated in FIG. 1 to be scanned over a receiver plane 19. The radiation scattered by the object 17 and received over the scanned receiver plane 19 comprises an object signal and may be converted into holographic information of the object 17 directly by detecting at the receiver plane 19 the interference pattern between the object signal and a reference signal, the latter comprising a portion of the wavefront 15 which is not scattered by the object 17. In order to produce holographic information at the receiver plane 19 in this manner, the point receiver 20 must comprise some sort of detector, such as a photocell in the case of visible light.

Alternately, holographic information of the object 17 can be produced electronically by feeding the received object signal into some sort of electronic mixing unit 21 where it is mixed with a reference signal 23 to produce holographic information at the output terminal 25.

It will be understood that the particular type of receiver or detector which is scanned over the plane 19 depends upon the particular type of wave radiation being utilized to produce the object signal and whether or not the holographic information is to be produced directly at the receiver plane or, alternatively, is to be produced at a later stage by electronic mixing. The present invention does not depend on the particular wave radiation utilized, nor does it depend on the particular method in which holographic information is to be produced from an object signal. With only one exception, the analysis to follow is completely general for any form of wave radiation and any wavelengths utilized and for either method of producing holographic information. Thus the invention is applicable to the entire spectrum of electromagnetic radiation, including visible light, microwaves, infrared, ultraviolet, X-rays, and radio waves, etc., and for all ranges of compressional or acoustic radiation including subsonic, sonic or seismic, supersonic, ultrasonic, hypersonic, and even phonons. The fundamental requirement for producing holographic information is that the wave radiation utilized must be coherent and monochromatic such that a radian frequency $\omega_0$ and a wavelength $\lambda_0$ can be defined. When such radiation is utilized, the object signal and the reference signal can be mixed together to produce interference which contains holographic information, i.e., information capable of reconstructing the original object signal and therefore images of the original object. The mixing of the object and the reference signals may occur at a detector which receives both signals directly; or, alternately, it may be the case that the object signal and the reference signal are received independently and then added together to cause interference in a separate detector. The electronic mixing technique referred to above would be a case of the latter technique.

The single exception referred to is in the case where modulated wave radiation is utilized to produce the object signal. Such wave radiation, for example, may be visible light modulated at microwave frequencies or it may be ultrasonic radiation modulated at sonic frequencies. In these cases the analysis differs only in that the receiver of the object signal must be capable of receiving the modulations rather than the radiation itself. Other than this slight difference, the analysis to follow is completely general for any type of wave radiation utilized.

Finally, it should be pointed out that the particular type of detector of the object signal may vary, depending on the particular type of wave radiation utilized. However, these differences have no bearing on the analysis. For example, in the case of visible light or visible light modulated at microwave frequencies, the detector is usually an energy or intensity detector whereas in the case of modulated ultrasound, the detector would most likely be an amplitude detector. The particular type of detector utilized is also dictated by the resolution requirements and the spatial frequency of the object signal. At optical frequencies, spatially extended detectors, such as photographic plates, are usually necessary since a scanning detector meeting the resolution requirements has not yet been produced in a practical form. However, such scanning detectors are presently available at lower frequencies, such as microwave or ultrasonic frequencies. For purposes of explanation of the reciprocity between receiver scanning and source scanning according to the present invention, however, it will be assumed that the necessary scanning mechanism is available. Obviously, where no practical receiver scanning mechanism is available with a given wave radiation but where a practical source scanning mechanism with such radiation is available, the present invention represents an additional advantage.

Figure 2:
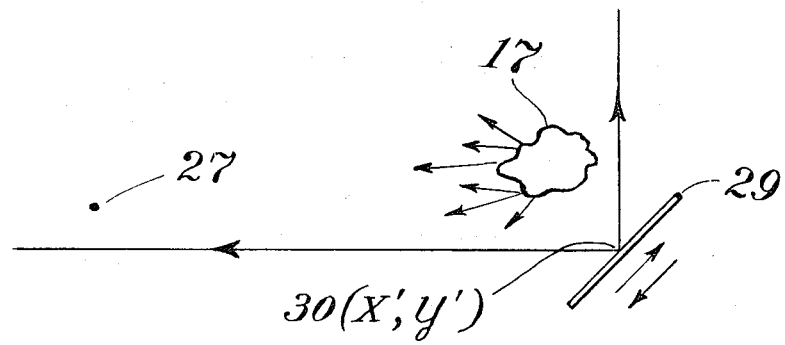
FIG. 2 is a diagrammatical representation of the present invention wherein the positions of the source and receiver have been interchanged with respect to FIG. 1 and wherein the source plane, rather than the receiver plane, is scanned.

With the foregoing as background and with reference to FIG. 2, the present invention is depicted in diagrammatical form and, in general, is exactly the reciprocal of the technique of FIG. 1. By this is meant in FIG. 2 a point receiver 27 has been inserted at the identical position as the effective point source of the diverging wavefront 15 in FIG. 1 and a point source 30 which is scanned over a source plane 29 has been inserted at the identical position as the receiver 20 which was scanned over the receiver plane 19 in FIG. 1. Thus in FIG. 2 instead of illuminating an object with a fixed point source of radiation and then receiving the object signal by scanning over a receiver plane, the object 17 is illuminated by scanning a point source over a source plane 29 and the object signal is received at a fixed point 27.

It should be pointed out that while the techniques of FIGS. 1 and 2 involve scanning a receiver and source plane respectively, in both techniques each point on the scanned plane is effective, at any instant of time, over the entire object 17. That is to say, in the case of FIG. 1 the point receiver 20 on the receiver plane 19 receives information at any instant of time from the entire object 17, while in the case of FIG. 2, the point source 30 which is scanned over the source plane 29 effectively illuminates the entire object 17. Similarly, while in the case of FIG. 1, the diverging wavefront 15 effectively illuminated the entire object 17, in the case of FIG. 2 the receiver point 27 receives information from the entire object 17.

Figure 2A:
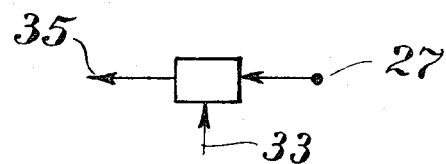
FIG. 2A is a modification of FIG. 2.

As in the case of FIG. 1, the technique of FIG. 2 may be such that holographic information is detected directly at the fixed point 27 by directing a portion of the source radiation directly to the point 27; or, in the alternative, as depicted in FIG. 2A, the object signal may be received at the fixed point 27 and then holographic information produced in a mixer 31 by introducing a reference signal 33. In this case, holographic information is produced at the output terminal 35 and may be transferred to a photographic film to produce a hologram.

As is well known in the field of holography, the hologram thus produced may be reconstructed by directing monochromatic spatially coherent radiation through the hologram and by observing a reconstructed image of the object by looking through the hologram as if it were a window. In the receiver-scanning technique described with respect to FIG. 1, the viewer is looking through a window described by the scanned area 19. Since, in FIG. 2, the positions of the receiver and source have been interchanged with respect to FIG. 1, the same scanned out area of the object will be viewed in the method of FIG. 2 as if the object were viewed through the scanned out area 29. It should be noted that the embodiment depicted in FIG. 2 has been chosen to be the reverse of the embodiment of FIG. 1 merely to make easier an analysis and comparison of the two methods. The particular perspective or area of the object 17 that the observer sees upon reconstructing an image from a hologram made according to a scanning technique depends upon the position of the scanning plane, whether it be the source that is being scanned or the receiver.

Reciprocity between the conventional receiver-scanning technique of FIG. 1 and the source scanning technique of FIG. 2 according to this invention is most clearly demonstrated by a mathematical analysis in which the equations utilized are general for any type of wave radiation utilized.

In the receiver-scanning technique of FIG. 1, coherent radiation is scattered from the object 17 to the receiving plane 19. A point receiver 20 at a given instant is located at position $(x,y)$ on this plane. The object signal wavefront $U_o$, of the scattered radiation may be mathematically represented by:

$$U_o = [A_o(x, y) \cos \{\omega_o t + \phi(x, y)\}] \qquad (1)$$

where $A_o(x,y)$ is the amplitude and $\phi(x,y)$ is the phase of the wavefront at point $(x,y)$. The coherent radiation has a radian frequency $\omega_o$ and a wavelength of $\lambda_o$.

Radiation reaching the receiver point 20, but not scattered from the object 17, is referred to as the reference beam. The reference beam wavefront may be represented by:

$$[U_R = A_R \cos \{\omega_o t + \theta(x, y)\}] \qquad (2)$$

where the wavefront amplitude, $A_R$, is essentially a constant across the receiver plane 19 and $\theta(x,y)$ is the phase at the receiver point, 20.

At the receiver plane, 19, the two beams are added together so that the total radiation amplitude is given by:
$$U(x,y,t) = U_o + U_R \qquad (3)$$

Of course, the reference beam may be provided electronically so that $U(x,y,t)$ represents the total signal amplitude after the two are added together, regardless of whether or not this occurs at the receiver plane, 19.

This signal is recorded by an energy-sensing, or square law, detector which records the time average of the square of the sums of amplitudes. This defines the interference pattern which is recorded as the hologram. This final expression is given by:

$$\langle U^2(x, y, t)\rangle = \tfrac{1}{2} A_o^2(x, y) + \tfrac{1}{2} A_R^2 \\ + A_o(x, y) A_R \cos\{\theta(x, y) - \phi(x, y)\} \quad (4)$$

where the brackets ⟨ ⟩ represents a time-averaged term.

For reconstruction, the reference beam alone is used to illuminate the hologram, so that the transmitted beam through the hologram contains the following term:

$$A_o(x, y) A_R^2 \cos\{\omega_o t + \theta(x, y)\} \cos\{\theta(x, y) - \phi(x, y)\} \quad (5)$$

which can be written as:

$$\tfrac{1}{2} A_o(x, y) A_R^2 \{\cos[\omega_o t + 2\theta(x, y) \\ - \phi(x, y)] + \cos(\omega_o t + \phi(x, y))\} \quad (6)$$

Examination of the last term of this expression shows it to be proportional to the wavefront of the object signal incident on the receiver plane. Thus a reconstructed wavefront of the object has been made resulting in a three-dimensional image of the object.

To show the source-receiver-scanning reciprocity, let us make an equivalent mathematical treatment of FIG. 2. In this case the receiver point, 27, is fixed at the previous source position and the source is on the source-scanning plane 29, which was the previous receiver-scanning plane 19. The source point, 30, on this plane is defined by the position $(x',y'$ the objection of the source point, 30, is given by:

$$U_o = A_o(x', y') \cos\{\omega_o t + \phi(x', y')\} \quad (7)$$

where amplitude and phase are defined as before.

The reference beam wavefront at receiver point, 27, as a function of source point position, 30, is given by:

$$U_R = A_R \cos\{\omega_o t + \theta(x', y')\} \quad (8)$$

where again the reference beam amplitude is essentially constant as the source is scanned over the plane 29, and $\phi(x',y')$ defines the phase.

Using a square law detector and reconstructing with the reference beam only, the same mathematical operations used in the previous treatment yield a final expression containing the term:

$$\tfrac{1}{2} A_o(x', y') A_R^2 \{\cos[\omega_o t + 2\theta(x', y') \\ - \phi(x', y')] + \cos(\omega_o t + \phi(x', y'))\} \quad (9)$$

The last term in this expression is equivalent to the last term of the previous case and shows that a reconstruction wavefront will result in a three-dimensional image of the object. The image resulting from the source-scanning technique will be identical to an image which would have resulted from conventional scanning techniques where the source and receiver was interchanged.

The general result of source-scanning techniques is therefore the production of a hologram which will reconstruct to form an image of the object. This image will be equivalent to the image which would have been obtained by conventional receiver-scanning techniques where the source and receiver positions are interchanged. Since in a great many practical holography situations the source and receiver position cannot be interchanged, this technique presents the ability to choose one technique over the other depending on whether the receiver plane or source plane can be most practically positioned to give the desired object perspective.

A wide range of applicability of the source-scanning technique, according to this invention, will be apparent to those skilled in the art. One example of an application in which the source-scanning technique may be preferable to the conventional receiver-scanning technique is in the field of nonoptical holography in which spatially extended detectors are usually not available. Systems in which the mechanism utilized to scan the receiver tends to produce noise presents another application in which a source-scanning technique may be preferable.

A specific application may be in the field of medical diagnostics wherein an ultrasonic hologram of a human stomach is made to determine the existence of any stomach disorders, etc. In such a case, it may be better to swallow a point receiver and scan a source outside the human body than vice versa, since it is practically difficult to scan such a receiver within the human stomach or to swallow a high-voltage source.

Another specific application of source scanning is in infrared holography such as may be used in nondestructive flaw detecting in objects, such as some ceramics, which are opaque to visible light but transparent to infrared. The energy level of individual photons of infrared may be very low and of the same order of magnitude as the thermal energy noise level in some infrared detectors such as semiconductor crystals. It may be necessary to refrigerate the infrared detector with liquid nitrogen or helium in order to reduce the thermal noise level to obtain the necessary sensitivity. In such cases, it would be much easier to scan the source of infrared rather than the bulky refrigerated detector in order to obtain holograms.

with reference to simplified embodiments and with reference to a few specific examples in which the invention may be useful, it will be apparent to those skilled in the art that the underlying principle of this invention represents a broad advance in the general field of holography and will present several additional embodiments or modifications of such embodiments. Therefore, it is intended that the invention should not be limited to the specific embodiment or examples described, but rather should be construed to include all such embodiments and applications as fall within the spirit and scope of the appended claims.

What is claimed is:

1. In the method of producing holographic information of object scenes with coherent wave radiation, the holographic information being contained in the interference pattern produced by mixing an object signal wavefront emanating from the object scene with a reference signal, the improvement comprising producing and receiving said object signal by scanning a point source of wave radiation over a plane, each point on said source plane effectively illuminating the entire object scene, and receiving said object signal at a single point fixed in space and fixed relative to the object scene, thereby to produce a holographic information signal of the object scene.

2. The method as defined in claim 1 wherein the holographic information is produced and detected at said fixed point in space by illuminating directly said fixed point in space with each point source on said scanned source plane.

3. The method as defined in claim 1 wherein the holographic information is produced by receiving said object signal at said fixed point in space and electronically mixing said received object signal with a reference signal coherent with said point source.

4. The method as defined in claim 1 wherein the scanned point source of wave radiation comprises electromagnetic radiation.

5. The method as defined in claim 4 wherein said electromagnetic radiation comprises visible light.

6. The method as defined in claim 4 wherein the electromagnetic radiation comprises ultraviolet light.

7. The method as defined in claim 4 wherein the electromagnetic radiation comprises infrared radiation.

8. The method as defined in claim 4 wherein the electromagnetic radiation comprises radiofrequency radiation.

9. The method as defined in claim 4 wherein the electromagnetic radiation comprises modulated electromagnetic radiation, said fixed point in space being responsive to the modulations of said electromagnetic radiation.

10. The method as defined in claim 4 wherein the electromagnetic radiation comprises X-ray radiation.

11. The method as defined in claim 4 wherein the electromagnetic radiation comprises microwave radiation.

12. The method as defined in claim 1 wherein the point source of wave radiation comprises a source of compressional radiation.

13. The method as defined in claim 12 wherein the compressional radiation comprises seismic radiation.

14. The method as defined in claim 12 wherein the compressional radiation comprises ultrasonic radiation.

15. The method as defined in claim 12 wherein the compressional radiation comprises hypersonic radiation.

16. The method as defined in claim 12 wherein the source of compressional radiation comprises phonons.

17. The method as defined in claim 12 wherein the compressional radiation comprises modulated compressional radiation, the fixed point in space being responsive to the modulations of the compressional radiation.

* * * * *